(12) United States Patent
Higuchi et al.

(10) Patent No.: US 7,482,062 B2
(45) Date of Patent: Jan. 27, 2009

(54) MAR RESISTANT SURFACE FILM-FORMING SILICONE COATING COMPOSITIONS AND COATED ARTICLES

(75) Inventors: Koichi Higuchi, Gunma-ken (JP); Masaaki Yamaya, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 330 days.

(21) Appl. No.: 11/251,915

(22) Filed: Oct. 18, 2005

(65) Prior Publication Data

US 2006/0083936 A1 Apr. 20, 2006

(30) Foreign Application Priority Data

Oct. 19, 2004 (JP) .............................. 2004-304241

(51) Int. Cl.
*B32B 27/06* (2006.01)
*B32B 9/04* (2006.01)
*C08L 83/04* (2006.01)

(52) U.S. Cl. ....................................... 428/447; 524/863
(58) Field of Classification Search ................. 428/447; 524/863
See application file for complete search history.

(56) References Cited

U.S. PATENT DOCUMENTS

| | | | |
|---|---|---|---|
| 3,175,993 A | | 3/1965 | Weyenberg |
| 3,542,830 A | * | 11/1970 | Kim .............................. 556/427 |
| 3,627,801 A | * | 12/1971 | Pierce et al. ................. 556/431 |
| 3,986,997 A | | 10/1976 | Clark |
| 4,027,073 A | | 5/1977 | Clark |
| 4,159,206 A | | 6/1979 | Armbruster et al. |
| 4,170,690 A | | 10/1979 | Armbruster et al. |
| 4,371,585 A | | 2/1983 | Memon |
| 4,695,603 A | * | 9/1987 | Inoue et al. .................. 524/723 |
| 4,772,675 A | | 9/1988 | Klosowski et al. |
| 4,888,380 A | * | 12/1989 | Kamis et al. ................. 524/588 |
| 5,091,460 A | | 2/1992 | Seto et al. |
| 5,190,804 A | | 3/1993 | Seto et al. |
| 5,314,981 A | * | 5/1994 | Takago et al. .................. 528/36 |
| 5,514,741 A | * | 5/1996 | Arai et al. .................... 524/437 |
| 5,605,958 A | * | 2/1997 | Yoneda et al. ............... 524/755 |
| 5,633,311 A | * | 5/1997 | Yamamoto et al. ............ 528/14 |
| 5,705,591 A | * | 1/1998 | Matsuda et al. ............... 528/42 |
| 5,853,896 A | * | 12/1998 | Kondo et al. ................. 428/429 |
| 5,919,886 A | * | 7/1999 | Matsuda et al. ............... 528/42 |
| 6,011,123 A | | 1/2000 | Kurosawa et al. |
| 6,313,233 B1 | | 11/2001 | Kurosawa et al. |
| 6,319,980 B1 | * | 11/2001 | Ishikawa et al. ............. 524/588 |
| 7,226,982 B2 | * | 6/2007 | Yamaya et al. ................ 528/35 |
| 2003/0087102 A1 | * | 5/2003 | Yamaya et al. .............. 428/419 |

FOREIGN PATENT DOCUMENTS

| | | |
|---|---|---|
| EP | 0 513 690 A2 | 11/1992 |
| EP | 1 375 615 A2 | 1/2004 |
| JP | 51-2736 | 1/1976 |
| JP | 53-130732 | 11/1978 |
| JP | 63-168470 A | 7/1988 |
| JP | 01275130 A * | 11/1989 |
| JP | 3-207774 A | 9/1991 |
| JP | 4-175388 A | 6/1992 |
| JP | 6-25600 A | 2/1994 |
| JP | 10-204292 A | 8/1998 |
| JP | 10-273623 A | 10/1998 |
| JP | 10-279804 A | 10/1998 |
| JP | 11-152446 A | 6/1999 |

* cited by examiner

*Primary Examiner*—Randy Gulakowski
*Assistant Examiner*—Robert Loewe
(74) *Attorney, Agent, or Firm*—Birch, Stewart, Kolasch & Birch, LLP

(57) ABSTRACT

Silicone coating compositions comprising a silicone resin which is obtained by cohydrolytic condensation of (A) an organosilicon compound, and (B) an alkoxysilane and/or (C) a fluorine-containing organosilicon compound form mar resistant surface-protecting films having a hardness, flexibility, crack resistance and weather resistance.

19 Claims, No Drawings

MAR RESISTANT SURFACE FILM-FORMING SILICONE COATING COMPOSITIONS AND COATED ARTICLES

CROSS-REFERENCE TO RELATED APPLICATION

This non-provisional application claims priority under 35 U.S.C. §119(a) on Patent Application No. 2004-304241 filed in Japan on Oct. 19, 2004, the entire contents of which are hereby incorporated by reference.

TECHNICAL FIELD

This invention relates to mar resistant surface film-forming silicone coating compositions and coated articles using the same. More particularly, it relates to silicone coating compositions which are applied and heat cured to the surface of various substrates to form mar resistant flexible films having a high hardness and improved properties such as mar resistance, crack resistance and weathering resistance, and coated articles having cured films of the silicone coating compositions on the surface of substrates.

BACKGROUND ART

Prior art coating compositions that form surface protective films on the surface of plastic substrates, typically organic resin substrates, for imparting a high hardness and mar resistance thereto include coating compositions obtained through (partial) hydrolysis of hydrolyzable organosilanes and coating compositions further comprising colloidal silica.

For example, JP-A 51-2736, JP-A 53-130732 and JP-A 63-168470 disclose coating compositions comprising an organoalkoxysilane, a hydrolyzate and/or partial condensate thereof, and colloidal silica, the alkoxy groups being converted in the presence of excess water into silanol. Coats resulting from these coating compositions are suitable for the protection of underlying substrates due to a high hardness and good weathering resistance, but lack toughness. Coats having a thickness of 10 μm or more are likely to crack during heat curing, upon removal from the heat curing furnace, during outdoor service, or upon abrupt temperature changes. These coating compositions suffer from problems which arise from the fact that the hydrolyzate and/or condensate of alkoxysilane is based on relatively low molecular weight compounds. In these relatively low molecular weight compounds, silanols having a very high reactivity are contained in large amounts. Such silanols undergo condensation reaction slowly even at normal temperature so that they convert to higher molecular weights with the lapse of time, resulting in coats having lower hardness. Further, some compositions have the problem of stability that they can gel and be no longer used for the coating purpose.

For overcoming these drawbacks, especially flexibility problem, it is contemplated to increase the amount of diorganoalkoxysilane in organoalkoxysilanes subject to hydrolytic condensation, for increasing the content of diorganosiloxy units. This approach, however, results in a substantially reduced hardness due to a reduced crosslink density, and detracts from curability.

Also, JP-A 3-207774, JP-A 10-204292, JP-A 10-273623, and JP-A 10-279804 disclose to improve flexibility by compounding silicone resins with organic resins such as epoxy resins, polyimide resins and/or polyamic acid resins, acrylic resins or urethane resins. These approaches are difficult to maintain the desired hardness. Since organic resins generally lack weather resistance as compared with siloxane resins, the coatings obtained therefrom are less weather resistant.

In connection with a film-forming composition comprising a hydrolytic oligomer of organosilane and a silica sol, JP-A 4-175388 proposes the compounding therein of a silanol-containing polyorganosiloxane resin; and JP-A 11-152446 proposes the compounding therein of an α,ω-dihydroxy linear diorganopolysiloxane. Since these compounding components somewhat lack compatibility with the composition and uniformity, it is difficult to increase the compounding amount so as to enhance flexibility and the resulting coatings are liable to cissing and whitening.

SUMMARY OF THE INVENTION

An object of the present invention is to provide silicone coating compositions which can form mar resistant surface-protecting films having a high hardness, mar resistance, and flexibility, as well as minimized cracking even on abrupt temperature changes; and coated articles having cured films of the silicone coating compositions on the surface of substrates.

It has been found that when a silicone coating composition comprising a silicone resin (I) which is obtained by cohydrolytic condensation of (A) a hydrolyzable organosilicon compound having the general formula (1), defined below, and/or a partial hydrolytic condensate thereof, and (B) an alkoxysilane having the general formula (2), defined below, and/or a partial hydrolytic condensate thereof, and/or (C) a hydrolyzable organosilicon compound having the general formula (3), defined below, and/or a partial hydrolytic condensate thereof is cured to a substrate to form a mar resistant film thereon, the film is endowed with flexibility without a loss of mar resistance. The film is unlikely to crack, delaminate or spall with the lapse of time. Similar results are achievable with a silicone coating composition comprising a silicone resin (II) obtained by (co)hydrolytic condensation of component (A) alone or components (A) and (B) and a silicon resin (III) obtained by (co)hydrolytic condensation of component (B) and/or (C).

Accordingly, the present invention provides coating compositions and coated articles as defined below.

[1] A silicone coating composition for forming a mar resistant surface film comprising a silicone resin (I) which is obtained by cohydrolytic condensation of:

(A) at least one hydrolyzable organosilicon compound having the general formula (1):

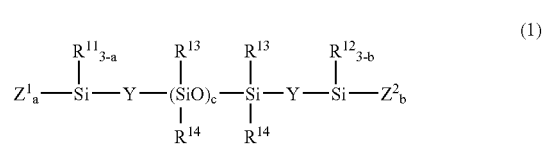

wherein $R^{11}$, $R^{12}$, $R^{13}$, and $R^{14}$ are each independently a hydrogen atom, alkyl group of 1 to 6 carbon atoms or phenyl group, $Z^1$ and $Z^2$ are each independently selected from the class consisting of a halogen atom, alkoxy group of 1 to 3 carbon atoms, alkoxyalkoxy group of 2 to 4 carbon atoms, acyloxy group of 1 to 6 carbon atoms, alkenoxy group of 1 to 6 carbon atoms, and isocyanate group, Y is an oxygen atom or alkylene group of 2 to 10 carbon atoms, a and b are each independently an integer of 1 to 3, and c is an integer of 1 to 30, and/or a partial hydrolytic condensate thereof, and (B) at least one alkoxysilane having the general formula (2):

$$(R^1)_m(R^2)_n Si(OR^3)_{4-m-n} \quad (2)$$

wherein $R^1$ and $R^2$ are each independently hydrogen or a substituted or unsubstituted monovalent hydrocarbon group, $R^3$ is an alkyl group of 1 to 3 carbon atoms, m and n are each independently an integer of 0 or 1, and m+n is 0, 1 or 2, and/or a partial hydrolytic condensate thereof, and/or (C) at least one hydrolyzable organosilicon compound having the general formula (3):

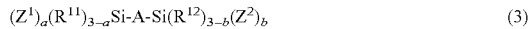

$$(Z^1)_a(R^{11})_{3-a}Si\text{-}A\text{-}Si(R^{12})_{3-b}(Z^2)_b \quad (3)$$

wherein $R^{11}$, $R^{12}$, $Z^1$ and $Z^2$ are as defined above, A is a divalent organic group having at least one fluorine atom, and a and b are as defined above, and/or a partial hydrolytic condensate thereof.

[2] The silicone coating composition of [1], wherein the silicone resin (I) has a weight average molecular weight of at least 1,500 as determined by gel permeation chromatography versus polystyrene standards.

[3] A silicone coating composition for forming a mar resistant surface coating comprising a silicone resin (II) which is obtained by (co)hydrolytic condensation of (A) at least one hydrolyzable organosilicon compound having the general formula (1):

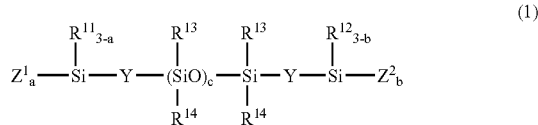

(1)

wherein $R^{11}$, $R^{12}$, $R^{13}$, and $R^{14}$ are each independently a hydrogen atom, alkyl group of 1 to 6 carbon atoms or phenyl group, $Z^1$ and $Z^2$ are each independently selected from the class consisting of a halogen atom, alkoxy group of 1 to 3 carbon atoms, alkoxyalkoxy group of 2 to 4 carbon atoms, acyloxy group of 1 to 6 carbon atoms, alkenoxy group of 1 to 6 carbon atoms, and isocyanate group, Y is an oxygen atom or alkylene group of 2 to 10 carbon atoms, a and b are each independently an integer of 1 to 3, and c is an integer of 1 to 30, and/or a partial hydrolytic condensate thereof, or component (A) and (B) at least one alkoxysilane having the general formula (2):

$$(R^1)_m(R^2)_n Si(OR^3)_{4-m-n} \quad (2)$$

wherein $R^1$ and $R^2$ are each independently hydrogen or a substituted or unsubstituted monovalent hydrocarbon group, $R^3$ is an alkyl group of 1 to 3 carbon atoms, m and n are each independently an integer of 0 or 1, and m+n is 0, 1 or 2, and/or a partial hydrolytic condensate thereof, and a silicone resin (III) which is obtained by (co)hydrolytic condensation of component (B) and/or (C) at least one hydrolyzable organosilicon compound having the general formula (3):

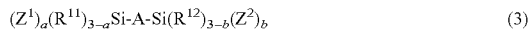

$$(Z^1)_a(R^{11})_{3-a}Si\text{-}A\text{-}Si(R^{12})_{3-b}(Z^2)_b \quad (3)$$

wherein $R^{11}$, $R^{12}$, $Z^1$ and $Z^2$ are as defined above, A is a divalent organic group having at least one fluorine atom, and a and b are as defined above, and/or a partial hydrolytic condensate thereof.

[4] The silicone coating composition of [3], wherein the silicone resins (II) and (III) each have a weight average molecular weight of at least 1,500 as determined by gel permeation chromatography versus polystyrene standards.

[5] The silicone coating composition of any one of [1] to [4], wherein in formula (1), a and b are each independently 2 or 3, and c is an integer of 1 to 10.

[6] The silicone coating composition of any one of [1] to [5], further comprising fine particles of at least one type selected from the group consisting of microparticulate metal oxides, microparticulate complex oxides, microparticulate hollow oxides, and microparticulate hollow complex oxides.

[7] The silicone coating composition of any one of [1] to [6], further comprising at least one UV absorber.

[8] The silicone coating composition of any one of [1] to [7], further comprising at least one organic polymer containing functional groups capable of reaction with the silicone resins.

[9] The silicone coating composition of [8], wherein said organic polymer is a vinyl polymer containing hydrolyzable silyl groups and/or hydroxysilyl groups.

[10] A coated article comprising a substrate and a cured film of the silicone coating composition of any one of [1] to [9] overlying at least one surface of the substrate directly or via at least one layer of different type.

[11] The coated article of [10], wherein said substrate is made of glass, metals, ceramics, organic resins or fibers.

As used herein, the term "(co)hydrolysis" means hydrolysis or cohydrolysis.

The coating composition of the invention is applied and heat cured to a substrate to form thereon a flexible film having hardness, mar resistance, crack resistance, and weather resistance.

DESCRIPTION OF THE PREFERRED EMBODIMENTS

The first embodiment of the invention is a silicone coating composition comprising a silicone resin (I) obtained by cohydrolytic condensation of component (A) and component (B) and/or (C). The second embodiment of the invention is a silicone coating composition comprising a silicone resin (II) obtained by (co)hydrolytic condensation of component (A) alone or components (A) and (B) and a silicon resin (III) obtained by (co)hydrolytic condensation of component (B) and/or (C). These components are described in detail.

Component A

Component (A) is at least one hydrolyzable organosilicon compound having the general formula (1) and/or a partial hydrolytic condensate thereof.

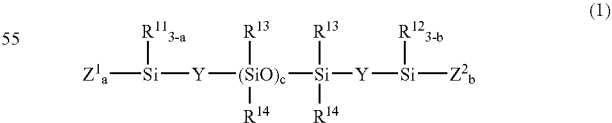

(1)

Herein $R^{11}$, $R^{12}$, $R^{13}$, and $R^{14}$ are each independently a hydrogen atom, an alkyl group of 1 to 6 carbon atoms or a phenyl group; $Z^1$ and $Z^2$ are each independently a halogen atom, an alkoxy group of 1 to 3 carbon atoms, an alkoxyalkoxy group of 2 to 4 carbon atoms, an acyloxy group of 1 to 6 carbon atoms, an alkenoxy group of 1 to 6 carbon atoms or an isocyanate group; Y is an oxygen atom or an alkylene group of 2 to 10 carbon atoms; a and b are each independently an integer of 1 to 3, and c is an integer of 1 to 30.

The hydrolyzable organosilicon compound having formula (1) has a linear structure consisting of diorganosiloxy units and is terminated at opposite ends with a plurality of hydrolyzable silyl groups having hydrolyzable groups represented by $Z^1$ and $Z^2$. It is this structure that contributes to the formulation of a silicone coating composition capable of forming a mar resistant surface film having flexibility and crack resistance at no sacrifice of abrasion resistance. Specifically, the hydrolyzable silyl groups at opposite ends undergo hydrolysis and condensation to crosslink for forming a network, as a result of which a high hardness film is formed. At the same time, the diorganosiloxy units between crosslinked sites impart an appropriate degree of flexibility. For this reason, a, b and c in formula (1) are crucial factors that affect hardness and flexibility.

In formula (1), $R^{11}$, $R^{12}$, $R^{13}$, and $R^{14}$ are each independently a hydrogen atom, an alkyl group of 1 to 6 carbon atoms or a phenyl group. Suitable alkyl groups include methyl, ethyl, n-propyl, i-propyl, n-butyl, sec-butyl, t-butyl, n-pentyl, cyclopentyl, n-hexyl, and cyclohexyl, with methyl being preferred for weather resistance and availability.

$Z^1$ and $Z^2$ are each independently a halogen atom, an alkoxy group of 1 to 3 carbon atoms, an alkoxyalkoxy group of 2 to 4 carbon atoms, an acyloxy group of 1 to 6 carbon atoms, an alkenoxy group of 1 to 6 carbon atoms or an isocyanate group. Examples include chlorine, bromine, methoxy, ethoxy, n-propoxy, i-propoxy, methoxyethoxy, acetoxy, isopropenoxy, and isocyanate. Inter alia, methoxy and ethoxy are preferred for easy control of hydrolytic reaction, availability and ease of handling.

Y is an oxygen atom or an alkylene group of 2 to 10 carbon atoms. Examples of the alkylene group include —(CH$_2$)$_2$—, —(CH$_2$)$_3$—, —[(CH$_3$)$_2$C]—, —[(CH$_3$)CH]—, —(CH$_2$)$_4$—, —(CH$_2$)$_5$—, —(CH$_2$)$_6$—, —(CH$_2$)$_8$—, —(CH$_2$)$_{10}$—, —(CH$_2$)$_2$—C$_6$H$_{10}$—(CH$_2$)$_2$—, and —(CH$_2$)$_2$—C$_6$H$_{10}$—. Inter alia, an oxygen atom and —(CH$_2$)$_2$— are preferred from the standpoints of availability and economy.

The subscripts a and b are each independently an integer of 1 to 3, preferably 2 or 3. If a and b are smaller than 2, there are less hydrolyzable groups per molecule, which may lead to a likelihood of bleeding out due to inefficient incorporation in the network, losing abrasion resistance due to a lower crosslinked density, or retarding the progress of cure.

The subscript c is an integer of 1 to 30, preferably 2 to 10. If c is 0, the effect that diorganosiloxane units between crosslinked sites impart flexibility is not achievable. If c is larger than the range, flexibility becomes rather excessive to incur an outstanding loss of abrasion resistance and the compound becomes more hydrophobic and hence, less compatible with components (B) and (C) and even with water, which restrains (co)hydrolytic condensation.

The hydrolyzable organosilicon compound can be synthesized by the well-known reactions shown below. (i) addition reaction of hydrogen-terminated siloxane and alkenyl-containing silanes

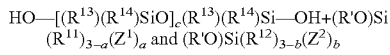

Herein $R^{11}$, $R^{12}$, $R^{13}$, $R^{14}$, $Z^1$, $Z^2$, a, b and c are as defined above, and Y' is an alkenyl group of 2 to 10 carbon atoms. (ii) addition reaction of alkenyl-terminated siloxane and hydrogensilanes

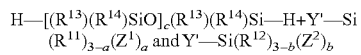

Herein $R^{11}$, $R^{12}$, $R^{13}$, $R^{14}$, $Z^1$, $Z^2$, a, b and c are as defined above, and Y' is an alkenyl group of 2 to 10 carbon atoms. (iii) alcohol-removal reaction of hydroxy-terminated siloxane and alkoxysilanes

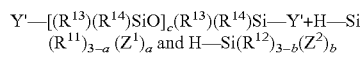

Herein $R^{11}$, $R^{12}$, $R^{13}$, $R^{14}$, $Z^1$, $Z^2$, a, b and c are as defined above, and R' is an alkyl group of 1 to 3 carbon atoms.

Examples of the hydrolyzable organosilicon compounds which are synthesized by these reactions are shown below.
(CH$_3$O)$_3$Si—CH$_2$CH$_2$—[(CH$_3$)$_2$SiO]—(CH$_3$)$_2$Si—CH$_2$CH$_2$—Si(OCH$_3$)$_3$,
(CH$_3$O)$_3$Si—CH$_2$CH$_2$—[(CH$_3$)$_2$SiO]$_2$—(CH$_3$)$_2$Si—CH$_2$CH$_2$—Si(OCH$_3$)$_3$,
(CH$_3$O)$_3$Si—CH$_2$CH$_2$—[(CH$_3$)$_2$SiO]$_3$—(CH$_3$)$_2$Si—CH$_2$CH$_2$—Si(OCH$_3$)$_3$,
(CH$_3$O)$_3$Si—CH$_2$CH$_2$—[(CH$_3$)$_2$SiO]$_4$—(CH$_3$)$_2$Si—CH$_2$CH$_2$—Si(OCH$_3$)$_3$,
(CH$_3$O)$_3$Si—CH$_2$CH$_2$—[(CH$_3$)$_2$SiO]$_6$—(CH$_3$)$_2$Si—CH$_2$CH$_2$—Si(OCH$_3$)$_3$,
(CH$_3$O)$_3$Si—CH$_2$CH$_2$—[(CH$_3$)$_2$SiO]$_9$—(CH$_3$)$_2$Si—CH$_2$CH$_2$—Si(OCH$_3$)$_3$,
(CH$_3$O)$_3$Si—CH$_2$CH$_2$—[(CH$_3$)$_2$SiO]$_{10}$—(CH$_3$)$_2$Si—CH$_2$CH$_2$—Si(OCH$_3$)$_3$,
(CH$_3$O)$_3$Si—CH$_2$CH$_2$—[(CH$_3$)$_2$SiO]$_{16}$—(CH$_3$)$_2$Si—CH$_2$CH$_2$—Si(OCH$_3$)$_3$,
(CH$_3$O)$_3$Si—CH$_2$CH$_2$—[(CH$_3$)$_2$SiO]$_{25}$—(CH$_3$)$_2$Si—CH$_2$CH$_2$—Si(OCH$_3$)$_3$,
(CH$_3$O)$_3$Si—CH$_2$CH$_2$—[(CH$_3$)$_2$SiO]$_{30}$—(CH$_3$)$_2$Si—CH$_2$CH$_2$—Si(OCH$_3$)$_3$,
(C$_2$H$_5$O)$_3$Si—CH$_2$CH$_2$—[(CH$_3$)$_2$SiO]$_c$—(CH$_3$)$_2$Si—CH$_2$CH$_2$—Si(OC$_2$H$_5$)$_3$,
(CH$_3$O)$_2$(CH$_3$)Si—CH$_2$CH$_2$—[(CH$_3$)$_2$SiO]$_c$—(CH$_3$)$_2$Si—CH$_2$CH$_2$—Si(OC$_2$H$_5$)$_3$,
(CH$_3$O)$_2$(CH$_3$)Si—CH$_2$CH$_2$—[(CH$_3$)$_2$SiO]$_c$—(CH$_3$)$_2$Si—CH$_2$CH$_2$—Si(CH$_3$)(OCH$_3$)$_2$,
(CH$_3$O)(CH$_3$)$_2$Si—CH$_2$CH$_2$—[(CH$_3$)$_2$SiO]$_c$—(CH$_3$)$_2$Si—CH$_2$CH$_2$—Si(OCH$_3$)$_3$,
(C$_2$H$_5$O)(CH$_3$)$_2$Si—CH$_2$CH$_2$—[(CH$_3$)$_2$SiO]$_c$—(CH$_3$)$_2$Si—CH$_2$CH$_2$—SiH(OCH$_3$)$_2$,
(CH$_3$O)(CH$_3$)$_2$Si—CH$_2$CH$_2$—[(CH$_3$)$_2$SiO]$_c$—(CH$_3$)$_2$Si—CH$_2$CH$_2$—Si(CH$_3$)$_2$(OCH$_3$),
(CH$_3$O)(CH$_3$)$_2$Si—CH$_2$CH$_2$—[(CH$_3$)$_2$SiO]$_c$—(CH$_3$)$_2$Si—CH$_2$CH$_2$—Si(C$_2$H$_5$)(OCH$_3$)$_2$,
(CH$_3$O)(CH$_3$)$_2$Si—CH$_2$CH$_2$—[(CH$_3$)$_2$SiO]$_c$—(CH$_3$)$_2$Si—CH$_2$CH$_3$)$_2$(OCH$_3$),
(CH$_3$O)$_3$Si—CH$_2$CH$_2$CH$_2$—[(CH$_3$)$_2$SiO]—(CH$_3$)$_2$Si—CH$_2$CH$_2$CH$_2$—Si(OCH$_3$)$_3$,
(C$_2$H$_5$O)$_3$Si—CH$_2$CH$_2$CH$_2$—[(CH$_3$)$_2$SiO]$_c$—(CH$_3$)$_2$Si—CH$_2$CH(CH$_3$)—Si(OC$_2$H$_5$)$_3$,
(C$_2$H$_5$O)$_2$HSi—(CH$_3$)CHCH$_2$—[(CH$_3$)$_2$SiO]$_c$—(CH$_3$)$_2$Si—CH$_2$CH(CH$_3$)—SiH(OC$_2$H$_5$)$_2$,
(CH$_3$O)$_3$Si—O—[(CH$_3$)$_2$SiO]$_c$—(CH$_3$)$_2$Si—CH$_2$CH$_2$—Si(OCH$_3$)$_3$,
(C$_2$H$_5$O)$_3$Si—O—[(CH$_3$)$_2$SiO]$_c$—(CH$_3$)$_2$Si—O—Si(OC$_2$H$_5$)$_3$,
(CH$_2$=(CH$_3$)CO)$_3$Si—CH$_2$CH$_2$—[(CH$_3$)$_2$SiO]$_c$—(CH$_3$)$_2$Si—CH$_2$CH$_2$—Si(OC(CH$_3$)=CH$_2$)$_3$, and
(CH$_3$COO)$_2$(CH$_3$)Si—CH$_2$CH$_2$—[(CH$_3$)$_2$SiO]$_c$—(CH$_3$)$_2$Si—CH$_2$CH$_2$—Si(CH$_3$)(OCOCH$_3$)$_2$.

Herein c is an integer of 1 to 30.

Of these hydrolyzable organosilicon compounds, preference is given to the following.
(CH$_3$O)$_3$Si—CH$_2$CH$_2$—[(CH$_3$)$_2$SiO]$_c$—(CH$_3$)$_2$Si—CH$_2$CH$_2$—Si(OCH$_3$)$_3$, (CH₃O)₂(CH₃)Si—CH₂CH₂—[(CH₃)₂SiO]_c—(CH₃)₂Si—CH₂CH₂—Si(CH₃)(OCH₃)₂,
(C₂H₅O)₃Si—CH₂CH₂—[(CH₃)₂SiO]_c—(CH₃)₂Si—CH₂CH₂—Si(OC₂H₅)₃,
(C₂H₅O)₂(CH₃)Si—CH₂CH₂—[(CH₃)₂SiO]_c—(CH₃)₂Si—CH₂CH₂—Si(CH₃)(OC₂H₅)₂,
(CH₃O)₃Si—O—[(CH₃)₂SiO]_c—(CH₃)₂Si—O—Si(OCH₃)₃,
(CH₃O)₂(CH₃)Si—O—[(CH₃)₂SiO]_c—(CH₃)₂Si—O—Si(CH₃)(OCH₃)₂,
(C₂H₅O)₃Si—O—[(CH₃)₂SiO]_c—(CH₃)₂Si—1O—Si(OC₂H₅)₃,
(C₂H₅O)₂(CH₃)Si—O—[(CH₃)₂SiO]_c—(CH₃)₂Si—O—Si(CH₃)(OC₂H₅)₂,
(CH₂=(CH₃)CO)₃Si—CH₂CH₂—[(CH₃)₂SiO]_c—(CH₃)₂Si—CH₂CH₂—Si(OC(CH₃)=CH₂)₃,
and
(CH₃COO)₂(CH₃)Si—CH₂CH₂—[(CH₃)₂SiO]_c—(CH₃)₂Si—CH₂CH₂—Si(CH₃)(OCOCH₃)₂.

Partial hydrolytic condensates of such hydrolyzable organosilicon compounds as component (A) may be obtained by subjecting the hydrolyzable organosilicon compounds to partial hydrolytic condensation by any conventional technique. For example, when hydrolyzable groups $Z^1$ and $Z^2$ are alkoxy groups, hydrolysis and condensation may be carried out using as the catalyst acids such as hydrochloric acid, nitric acid, acetic acid, and cation exchange resins having carboxylic or sulfonic acid groups on their surface, and metal compounds such as aluminum triisopropoxide, titanium tetrabutoxide, aluminum triacetylacetone, dioctyltin dilaurate, and zinc octylate. An appropriate amount of water used is the amount necessary to hydrolyze all alkoxy groups (theoretical amount) multiplied by 0.1 to 0.9. Suitable reaction conditions include 0 to 150° C. and 0.5 to 48 hours. If necessary, solvents may be used, for example, alcohol solvents such as methanol, ethanol, isopropanol, isobutanol, propylene glycol monomethyl ether, and diacetone alcohol, ketone solvents such as acetone, methyl ethyl ketone and cyclohexanone, and ester solvents such as ethyl acetate and isobutyl acetate.

Component B

Component (B) is at least one alkoxysilane having the general formula (2) and/or a partial hydrolytic condensate thereof.

$$(R^1)_m(R^2)_n Si(OR^3)_{4-m-n} \quad (2)$$

Herein $R^1$ and $R^2$ are each independently hydrogen or a substituted or unsubstituted monovalent hydrocarbon group, $R^3$ is an alkyl group of 1 to 3 carbon atoms, m and n are each independently an integer of 0 or 1, and m+n is 0, 1 or 2.

In formula (2), $R^1$ and $R^2$ are each independently selected from hydrogen and substituted or unsubstituted monovalent hydrocarbon groups, for example, hydrogen; alkyl groups such as methyl, ethyl, propyl, butyl, pentyl, hexyl, heptyl and octyl; cycloalkyl groups such as cyclopentyl and cyclohexyl; alkenyl groups such as vinyl and allyl; aryl groups such as phenyl; halo-substituted hydrocarbon groups such as chloromethyl, γ-chloropropyl, and 3,3,3-trifluoropropyl; and substituted hydrocarbon groups such as γ-methacryloxypropyl, γ-glycidoxypropyl, 3,4-epoxycyclohexylethyl, γ-mercaptopropyl, and γ-aminopropyl. $R^3$ is selected from alkyl groups of 1 to 3 carbon atoms, for example, methyl, ethyl, n-propyl, and isopropyl.

The alkoxysilane of formula (2) wherein m=0 and n=0 is (b-1) a tetraalkoxysilane of the formula: $Si(OR^3)_4$ or a partial hydrolytic condensate thereof. Examples of suitable tetraalkoxysilane and partial hydrolytic condensate thereof include tetramethoxysilane, tetraethoxysilane, tetraisopropoxysilane, tetrabutoxysilane; partial hydrolytic condensates of tetramethoxysilane, which are commercially available under the trade name of M Silicate 51 from Tama Chemicals Co., Ltd., MSI51 from Colcoat Co., Ltd., and MS51 and MS56 from Mitsubishi Chemical Co., Ltd.; partial hydrolytic condensates of tetraethoxysilane, which are commercially available under the trade name of Silicate 35 and Silicate 45 from Tama Chemicals Co., Ltd., ESI40 and ESI48 from Colcoat Co., Ltd.; and partial co-hydrolytic condensates of tetramethoxysilane and tetraethoxysilane, which are commercially available under the trade name of FR-3 from Tama Chemicals Co., Ltd. and EMSi48 from Colcoat Co., Ltd.

The alkoxysilane of formula (2) wherein m=1 and n=0 is (b-2) a trialkoxysilane of the formula: $R^1Si(OR^3)_3$ or a partial hydrolytic condensate thereof. Examples of suitable trialkoxysilane and partial hydrolytic condensate thereof include hydrogentrimethoxysilane, hydrogentriethoxysilane, methyltrimethoxysilane, methyltriethoxysilane, methyltriisopropoxysilane, ethyltrimethoxysilane, ethyltriethoxysilane, ethyltriisopropoxysilane, propyltrimethoxysilane, propyltriethoxysilane, propyltriisopropoxysilane, phenyltrimethoxysilane, vinyltrimethoxysilane, allyltrimethoxysilane, γ-methacryloxypropyltrimethoxysilane, γ-methacryloxypropyltriethoxysilane, γ-acryloxypropyltrimethoxysilane, γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane; and partial hydrolytic condensates of methyltrimethoxysilane, which are commercially available as KC-89S and X-40-9220 from Shin-Etsu Chemical Co., Ltd.; and partial hydrolytic condensates of methyltrimethoxysilane and γ-glycidoxypropyltrimethoxysilane, which are commercially available as X-41-1056 from Shin-Etsu Chemical Co., Ltd.

The alkoxysilane of formula (2) wherein m=1 and n=1 is (b-3) a dialkoxysilane of the formula: $(R^1)(R^2)Si(OR^3)_2$ or a partial hydrolytic condensate thereof. Examples of suitable dialkoxysilane and partial hydrolytic condensate thereof include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, vinylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, γ-methacryloxypropylmethyldimethoxysilane, γ-methacryloxypropylmethyldiethoxysilane, γ-mercaptopropylmethyldimethoxysilane, γ-aminopropylmethyldiethoxysilane, and N-(2-aminoethyl)aminopropylmethyldimethoxysilane.

For $R^1$ and $R^2$ in (b-2) and (b-3), alkyl groups are preferred in the applications where mar resistance and weather resistance are required; and epoxy or (meth)acryloxy-substituted hydrocarbon groups are preferred in the event requiring toughness and dyeability. For $R^3$ in (b-1), (b-2) and (b-3), methyl and ethyl are preferred because of high reactivity for hydrolytic condensation and a high vapor pressure of the resulting alcohol $R^3OH$, which is easy to distill off.

Component C

Component (C) is at least one hydrolyzable organosilicon compound having the general formula (3) and/or a partial hydrolytic condensate thereof.

$$(Z^1)_a(R^{11})_{3-a}\text{Si-A-Si}(R^{12})_{3-b}(Z^2)_b \quad (3)$$

Herein $R^{11}$, $R^{12}$, $Z^1$ and $Z^2$ are as defined above, A is a divalent organic group having at least one fluorine atom, and a and b are as defined above.

"A" is a divalent organic group having at least one fluorine atom. Any divalent organic group may be used as long as it contains one or more fluorine atoms. Typically A stands for organic groups having 1 to 40 carbon atoms in total, especially 2 to 30 carbon atoms in total, which may be separated by an oxygen atom, and more preferably alkylene groups of 1 to 40 carbon atoms in total, especially 2 to 30 carbon atoms in total, which are separated by a perfluoroalkylene group. Illustrative structures are exemplified below.

—CH$_2$CH$_2$—(CF$_2$)$_d$—CH$_2$CH$_2$—,
—CH$_2$CH$_2$—CF(CF$_3$)—(CF$_2$)$_d$—CF(CF$_3$)—CH$_2$CH$_2$—,
—CH$_2$CH$_2$—CF(C$_2$F$_5$)—(CF$_2$)$_d$—CF(C$_2$F$_5$)—CH$_2$CH$_2$—,
—CH$_2$CH$_2$—CF(CF$_3$)CF$_2$—O—(CF$_2$)$_d$—O—CF$_2$CF(CF$_3$)—CH$_2$CH$_2$—,
—CH$_2$CH$_2$—C$_6$F$_{10}$—CH$_2$CH$_2$—, and
—CH$_2$CH$_2$—C$_6$F$_4$—CH$_2$CH$_2$—.

Note that d is an integer of 2 to 20.

Of these, —CH$_2$CH$_2$—(CF$_2$)$_d$—CH$_2$CH$_2$— and —CH$_2$CH$_2$—CF(CF$_3$)—(CF$_2$)$_d$—CF(CF$_3$)—CH$_2$CH$_2$— are preferred, and those wherein d is 4 to 10 are more preferred because a hard film having better antireflection is obtainable. If d is smaller than the range, some of functions including antireflection, anti-staining, water repellency, and chemical resistance may not be achieved to a full extent. If d is larger than the range, there may occur a decline of crosslinked density and a decline of hardness, failing to provide sufficient abrasion resistance.

Illustrative examples of the organosilicon compounds satisfying the foregoing requirements are given below.

(CH$_3$O)$_3$Si—CH$_2$CH$_2$—(CF$_2$)$_4$—CH$_2$CH$_2$—Si(OCH$_3$)$_3$,
(CH$_3$O)$_3$Si—CH$_2$CH$_2$—(CF$_2$)$_6$—CH$_2$CH$_2$—Si(OCH$_3$)$_3$,
(CH$_3$O)$_3$Si—CH$_2$CH$_2$—(CF$_2$)$_8$—CH$_2$CH$_2$—Si(OCH$_3$)$_3$,
(CH$_3$O)$_3$Si—CH$_2$CH$_2$—(CF$_2$)$_{10}$—CH$_2$CH$_2$—Si(OCH$_3$)$_3$,
(CH$_3$O)$_3$Si—CH$_2$CH$_2$—(CF$_2$)$_{16}$—CH$_2$CH$_2$—Si(OCH$_3$)$_3$,
(C$_2$H$_5$O)$_3$Si—CH$_2$CH$_2$—(CF$_2$)$_4$—CH$_2$CH$_2$—Si(OC$_2$H$_5$)$_3$,
(C$_2$H$_5$O)$_3$Si—CH$_2$CH$_2$—(CF$_2$)$_6$—CH$_2$CH$_2$—Si(OC$_2$H$_5$)$_3$,
(CH$_3$O)$_2$CH$_3$Si—CH$_2$CH$_2$—(CF$_2$)$_4$—CH$_2$CH$_2$—SiCH$_3$(OCH$_3$)$_2$,
(CH$_3$O)$_2$CH$_3$Si—CH$_2$CH$_2$—(CF$_2$)$_6$—CH$_2$CH$_2$—SiCH$_3$(OCH$_3$)$_2$,
(CH$_3$O)(CH$_3$)$_2$Si—CH$_2$CH$_2$—(CF$_2$)$_4$—CH$_2$CH$_2$—Si(CH$_3$)$_2$(OCH$_3$),
(CH$_3$O)(CH$_3$)$_2$Si—CH$_2$CH$_2$—(CF$_2$)$_6$—CH$_2$CH$_2$—Si(CH$_3$)$_2$(OCH$_3$),
(CH$_3$O)$_3$Si—CH$_2$CH$_2$—CF(CF$_3$)(CF$_2$)$_4$CF(CF$_3$)—CH$_2$CH$_2$—Si(OCH$_3$)$_3$,
(CH$_3$O)$_3$Si—CH$_2$CH$_2$—CF(CF$_3$)(CF$_2$)$_6$CF(CF$_3$)—CH$_2$CH$_2$—Si(OCH$_3$)$_3$,
(CH$_3$O)$_3$Si—CH$_2$CH$_2$—CF(CF$_3$)(CF$_2$)$_{12}$CF(CF$_3$)—CH$_2$CH$_2$—Si(OCH$_3$)$_3$,
(CH$_3$O)$_3$Si—CH$_2$CH$_2$—C$_6$F$_{10}$—CH$_2$CH$_2$—Si(OCH$_3$)$_3$, and
(CH$_3$O)$_3$Si—CH$_2$CH$_2$—C$_6$F$_4$—CH$_2$CH$_2$—Si(OCH$_3$)$_3$.

Of these organosilicon compounds, preference is given to the following.

(CH$_3$O)$_3$Si—CH$_2$CH$_2$—(CF$_2$)$_4$—CH$_2$CH$_2$—Si(OCH$_3$)$_3$,
(CH$_3$O)$_3$Si—CH$_2$CH$_2$—(CF$_2$)$_6$—CH$_2$CH$_2$—Si(OCH$_3$)$_3$,
(CH$_3$O)$_3$Si—CH$_2$CH$_2$—(CF$_2$)$_8$—CH$_2$CH$_2$—Si(OCH$_3$)$_3$,
(C$_2$H$_5$O)$_3$Si—CH$_2$CH$_2$—(CF$_2$)$_4$—CH$_2$CH$_2$—Si(OC$_2$H$_5$)$_3$, and
(C$_2$H$_5$O)$_3$Si—CH$_2$CH$_2$—(CF$_2$)$_6$—CH$_2$CH$_2$—Si(OC$_2$H$_5$)$_3$.

According to the invention, the foregoing components (A), (B) and (C) are subjected to (co)hydrolytic condensation to form silicone resins (I), (II) and (III).

Silicone Resin I

Silicone resin (I) is obtained by cohydrolytic condensation of component (A) and component (B) and/or (C). Specifically, it is a cohydrolytic condensate of components (A) and (B), a cohydrolytic condensate of components (A) and (C), or a cohydrolytic condensate of components (A), (B) and (C).

Silicone Resin II

Silicone resin (II) is obtained by (co)hydrolytic condensation of component (A) or component (A) and (B). Specifically, it is a hydrolytic condensate of component (A), or a cohydrolytic condensate of components (A) and (B).

Silicone Resin III

Silicone resin (III) is obtained by (co)hydrolytic condensation of component (B) and/or (C). Specifically, it is a hydrolytic condensate of component (B), a hydrolytic condensate of component (C), or a cohydrolytic condensate of components (B) and (C).

In order to establish both crack resistance and abrasion resistance as the key feature of the present invention, a silicone resin comprising component (A) should preferably use 1 to 100% by weight of component (A), 0 to 99% by weight of component (B), and 0 to 99% by weight of component (C), based on the total (100% by weight) of components (A), (B) and (C). More preferably there are used 1 to 50% by weight of component (A), 49 to 99% by weight of component (B), and 0 to 50% by weight of component (C), and even more preferably 2 to 35% by weight of component (A), 63 to 98% by weight of component (B), and 0 to 35% by weight of component (C).

In the case of a silicone resin free of component (A), there may be used 0 to 100% by weight of component (B) and 0 to 100% by weight of component (C), based on the total (100% by weight) of components (B) and (C). Where both components (B) and (C) are used, it is preferred that component (B) be 0.1 to 99.9% by weight, especially 1 to 99% by weight.

Particularly in the case of a silicone resin containing component (B), it may be prepared using the aforementioned components (b-1), (b-2) and (b-3) in any desired proportion. For improved storage stability, mar resistance and crack resistance, it is preferred to use 1 to 50 Si mol % of (b-1), 50 to 99 Si mol % of (b-2), and 0 to 10 Si mol % of (b-3), based on the total (100 Si mol %) of (b-1), (b-2), and (b-3). If the main component (b-2) is less than 50 Si mol %, the resin tends to become less curable due to a lower crosslinked density and form a cured film having a lower hardness. If component (b-1) is used in excess of 50 Si mol %, the resin may have too high a crosslinked density and lose toughness, making it difficult to avoid cracking. It is noted that the term "Si mol %" refers to a percent based on entire Si moles. By the Si mole, it is meant that for a monomer, its molecular weight is 1 mole, and for a dimer, its average molecular weight divided by 2 is 1 mole.

For (co)hydrolytic condensation reaction, for example, one of the aforementioned components or a mixture thereof is first (co)hydrolyzed with water at pH 1 to 7, preferably pH 2 to 6, and more preferably pH 2 to 5. Use may be made of a dispersion of microparticulate metal oxide in water such as silica sol. For adjustment to the desired pH range and promoted hydrolysis, there may be used as the catalyst organic or inorganic acids, for example, hydrogen fluoride, hydrochloric acid, nitric acid, formic acid, acetic acid, propionic acid, oxalic acid, citric acid, maleic acid, benzoic acid, malonic acid, glutaric acid, glycolic acid, methanesulfonic acid, and toluenesulfonic acid; solid acid catalysts in the form of cation exchange resins having carboxylic or sulfonic acid groups on their surface; and dispersions of metal oxide microparticulates in water such as acidic water-dispersed silica sol. During the hydrolysis, a dispersion of metal oxide microparticulates in water or an organic solvent such as silica sol may be co-present.

For the hydrolysis, the amount of water used may be from 20 parts by weight to 3,000 parts by weight per 100 parts by weight of the mixture of components. If water is used in excess, the system efficiency becomes decreased and a final composition formulated from the resulting silicone resin becomes inefficient in application and drying due to the influence of residual water. For improving shelf stability, mar resistance and crack resistance, the amount of water is preferably from 50 parts to less than 100 parts by weight per 100 parts by weight of the mixture. With less than 50 parts by weight of water, the resulting silicone resin may have a weight average molecular weight, as measured by GPC with polystyrene standards, which is not built up to the optimum region to be described later. If the amount of water used is equal to or more than 100 parts by weight, the resulting silicone coating composition may become rather difficult to apply and dry and may sometimes lose crack resistance.

Hydrolysis can be performed by adding dropwise or pouring water to the alkoxysilanes or partial hydrolytic condensates thereof, or inversely, by adding dropwise or pouring the alkoxysilanes or partial hydrolytic condensates thereof to water. An organic solvent may be contained herein. However, the absence of organic solvent is preferred because of the tendency that the resulting silicone resin is reduced in weight average molecular weight (measured by GPC with polystyrene standards) as the amount of an organic solvent contained increases.

The hydrolysis must be followed by condensation before the silicone resin of the invention can be obtained. Condensation may be continuously carried out subsequent to the hydrolysis while typically heating the liquid at a temperature from normal temperature to 100° C. Temperatures above 100° C. may cause the liquid to gel. Since an alcohol(s) is formed during hydrolysis, condensation can be promoted by distilling off the alcohol(s) under atmospheric or reduced pressure at a temperature of at least 80° C. To promote the condensation, condensation catalysts such as basic compounds, acidic compounds or metal chelate compounds may be added. Prior to or during the condensation, an organic solvent may be added for the purpose of adjusting the progress of condensation and the concentration of the reaction solution. Alternatively, a dispersion of metal oxide microparticulates in water or an organic solvent such as silica sol may be added. In general, as condensation proceeds, silicone resins become higher in molecular weight and less soluble in water and the alcohol(s) formed. Thus, the organic solvent to be added should preferably be selected from more polar organic solvents have a boiling point of at least 80° C. in which silicone resins are effectively dissolvable. Examples of suitable organic solvents include alcohols such as isopropyl alcohol, n-butanol, isobutanol, t-butanol and diacetone alcohol; ketones such as methyl propyl ketone, diethylketone, methyl isobutyl ketone, and cyclohexanone; ethers such as dipropyl ether, dibutyl ether, anisole, tetrahydrofuran, dioxane, ethylene glycol monoethyl ether, ethylene glycol monobutyl ether, propylene glycol monomethyl ether, and propylene glycol monomethyl ether acetate; esters such as propyl acetate, butyl acetate, cyclohexyl acetate, and γ-butyrolactone; amides such as dimethylformamide, dimethylacetamide and N-methylpyrrolidone; and β-diketones and β-keto esters such as acetylacetone and ethyl acetoacetate.

The silicone resin resulting from condensation should preferably have a weight average molecular weight of at least 1,500, as measured by gel permeation chromatography (GPC) with polystyrene standards. The weight average molecular weight (Mw) is more preferably in the range of 1,500 to 50,000. With a molecular weight below the range, coats may become less tough and liable to cracking. With too high a molecular weight, coats tend to have a lower hardness and undergo resin phase separation, becoming whitened.

The silicone coating composition of the invention contains silicone resin (I) or contains silicone resins (II) and (III). In the latter case, the proportion of silicone resins (II) and (III) is preferably such that the ratio II/III is from 0.5 to 99.5, more preferably from 1 to 99 by weight.

To the silicone coating composition of the invention, solvents, pH modifiers, leveling agents, thickeners, pigments, dyes, microparticulate metal oxides, metal powders, oxidation inhibitors, UV absorbers, UV stabilizers, IR reflecting/absorbing agents, flexibilizers, antistatic agents, anti-staining agents, water repellents or the like may be added, if necessary, and as long as they do not compromise the benefits of the invention.

To the silicone coating composition, a solvent may be added for the purpose of improving its applicability and storage stability. The solvent used herein is not particularly limited as long as solids (silicone resins) of the composition are dissolvable therein. Water and relatively polar organic solvents are preferred. Examples of suitable organic solvents include alcohols such as isopropyl alcohol, n-butanol, isobutanol, t-butanol and diacetone alcohol; ketones such as methyl propyl ketone, diethyl ketone, methyl isobutyl ketone, and cyclohexanone; ethers such as dipropyl ether, dibutyl ether, anisole, tetrahydrofuran, dioxane, ethylene glycol monoethyl ether, ethylene glycol monobutyl ether, propylene glycol monomethyl ether, propylene glycol monomethyl ether acetate, propylene glycol monopropyl ether, and dipropylene glycol monomethyl ether; esters such as propyl acetate, butyl acetate, cyclohexyl acetate, and γ-butyrolactone; amides such as dimethylformamide, dimethylacetamide and N-methylpyrrolidone; and β-diketones and β-keto esters such as acetylacetone and ethyl acetoacetate. These solvents may be used alone or in admixture of two or more.

The solvent is preferably used in such amounts that the silicone coating composition may have a solids (i.e., silicone resins) concentration of 1 to 30% by weight. Outside the range, some coats resulting from the coating and curing of the composition become defective. Specifically, below the range, coats tend to become sagged, twisted or mottled, failing to provide the desired hardness and mar resistance. Beyond the range, coats are susceptible to blushing or whitening and cracking.

For rendering the silicone coating composition of the invention more stable during storage, it is preferably maintained at pH 2 to 7, more preferably pH 3 to 6. Since shelf stability can be substantially degraded at pH outside the range, a pH modifier may be added for adjusting the pH to the above range. Where the pH of the silicone coating composition is more acidic outside the range, a basic compound such as ammonia or ethylene diamine may be added for pH adjustment. Where the pH of the composition is more basic outside the range, an acidic compound such as hydrochloric acid, nitric acid, acetic acid or citric acid may be added for pH adjustment. However, the pH adjusting technique is not limited to these.

For the purpose of improving the hardness and mar resistance of cured films obtained by coating and curing the silicone coating composition of the invention and for imparting thereto additional functions such as a lower or higher refractive index, UV barrier, antistatic, IR reflection and absorption, there may be added microparticulate or hollow microparticulate metal oxides, metal chelate compounds of titanium, zinc, zirconium or the like, and (partial) hydrolyzates and condensates thereof. For the microparticulate metal oxides, the shape and size of particles are not particularly limited although a smaller particle size is better for forming more transparent films. Examples of microparticulate metal oxides include, but are not limited to, silica, alumina, titania, ceria, tin oxide, zirconia, antimony oxide, indium oxide, iron oxide, titania doped with iron oxide and/or zirconia, rare earth oxides, and mixtures and complex oxides thereof. Colloidal dispersions of such microparticulate metal oxides may also be used. Alternatively, metal oxides in powder form may be dispersed in the silicone coating compositions. Prior to use, the particles may be surface treated with organometallic compounds, carboxylic acid-containing organic compounds or nitrogen-containing compounds such as silane, titanium, aluminum or zirconium coupling agents. The amount of microparticulate metal oxide added is preferably 0.1 to 300% by weight, especially 1 to 100% by weight, based on the solids (silicone resins) in the silicone coating composition.

Further to the silicone coating composition of the invention, a vinyl polymer having functional groups capable of reacting with the silicone resins may be added for the purpose of improving adhesion and imparting additional flexibility. Suitable functional groups capable of reacting with the silicone resins include hydrolyzable silyl groups such as trimethoxysilyl, triethoxysilyl, dimethoxymethylsilyl, and methoxydimethylsilyl groups, and hydroxysilyl groups resulting from (partial) hydrolysis of the foregoing groups. Where the silicone resin in the composition contains epoxy groups, the functional groups are organic groups containing amino, carboxylic and similar groups. Where the silicone resin in the composition contains amino groups, the functional groups are organic groups containing epoxy, carboxylic, (meth)acrylic and similar groups. Inter alia, hydrolyzable silyl groups and hydroxysilyl groups resulting from (partial) hydrolysis of these groups are preferred from the standpoint of storage stability. The preferred vinyl polymers are copolymers of (meth)acrylic acids and derivatives thereof such as methyl (meth)acrylate, butyl (meth)acrylate, 2-ethylhexyl (meth)acrylate, cyclohexylmethyl (meth)acrylate, glycidyl (meth)acrylate, (meth)acrylic amide, and (meth)acrylic acid, or vinyl polymerizable monomers such as vinyl acetate with alkoxysilanes having a (meth)acryloxy group or alkoxysilanes having a vinyl and/or styryl group. The amount of the vinyl polymer added is preferably 0.1 to 100% by weight based on the solids (silicone resins) in the silicone coating composition.

When the silicone coating composition of the invention is applied and cured to substrates of organic resins or wood to form cured films thereon, a UV absorber and/or UV stabilizer may be added to the composition for the purpose of preventing the substrate from yellowing and surface deterioration. Those UV absorbers and UV stabilizers which are compatible with the silicone coating composition of the invention and less volatile are preferred.

Examples of UV absorbers include inorganic absorbers, for example, microparticulate oxides of the type described above such as titanium oxide, cerium oxide and zirconium oxide, metal chelate compounds of titanium, zinc, zirconium and the like, and (partial) hydrolyzates and condensates thereof. Preferred organic UV absorbers are derivatives of hydroxybenzophenone, benzotriazole, cyanoacrylate and triazine backbone compounds. Also included are vinyl and other polymers having such UV absorbers incorporated on side chains and copolymers thereof with other vinyl monomers, and silyl-modified UV absorbers and (partial) hydrolytic condensates thereof. Examples include 2,4-dihydroxybenzophenone, 2,2',4,4'-tetrahydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methylphenyl)benzotriazole, 2-(2-hydroxy-5-t-octylphenyl)benzotriazole, 2-(2-hydroxy-3,5-di-t-butylphenyl)benzotriazole, ethyl 2-cyano-3,3-diphenylacrylate, 2-ethylhexyl 2-cyano-3,3-diphenylacrylate, 2-(2-hydroxy-4-hexyloxyphenyl)-4,6-diphenyltriazine, (co)polymers of 2-hydroxy-4-(2-acryloxyethoxy)benzophenone, (co)polymers of 2-(2'-hydroxy-5'-methacryloxyethylphenyl)-2H-benzotriazole, the reaction product of 2,4-dihydroxybenzophenone with γ-glycidoxypropyltrimethoxysilane, the reaction product of 2,2',4,4'-tetrahydroxybenzophenone with γ-glycidoxypropyltrimethoxysilane, and (partial) hydrolytic condensates thereof. These organic UV absorbers may be used in admixture of two or more.

Preferred UV stabilizers are low volatile compounds which have at least one cyclic hindered amine structure within a molecule and are compatible with the silicone coating composition of the invention. Examples include 3-dodecyl-1-(2,2,6,6-tetramethyl-4-piperidinyl)pyrrolidine-2,5-dione, N-methyl-3-dodecyl-1-(2,2,6,6-tetramethyl-4-piperidinyl)-pyrrolidine-2,5-dione, N-acetyl-3-dodecyl-1-(2,2,6,6-tetramethyl-4-piperidinyl)-pyrrolidine-2,5-dione, bis(2,2,6,6-tetramethyl-4-piperidyl) sebacate, bis(1,2,2,6,6-pentamethyl-4-piperidyl) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, condensates of 1,2,3,4-butanetetracarboxylic acid with 2,2,6,6-tetramethyl-piperidinol and tridecanol, 8-acetyl-3-dodecyl-7,7,9,9-tetramethyl-1,3,8-trisazaspiro-[4,5]decane-2,4-dione, condensates of 1,2,3,4-butanetetracarboxylic acid with 1,2,2,6,6-pentamethyl-4-piperidinol and β,β,β,β'-tetramethyl-3,9-(2,4,8,10-tetraoxaspiro[5,5]undecane)diethanol, and condensates of 1,2,3,4-butanetetracarboxylic acid with 1,2,2,6,6-pentamethyl-4-piperidinol and β,β,β,β'-tetramethyl-3,9-(2,4,8,10-tetraoxaspiro[5,5]undecane)diethanol. Also useful for the purpose of fixing the light stabilizer are silyl-modified photostabilizers as described in JP-B 61-56187, for example, 2,2,6,6-tetramethylpiperidino-4-propyltrimethoxysilane, 2,2,6,6-tetramethylpiperidino-4-propylmethyldimethoxysilane, 2,2,6,6-tetramethylpiperidino-4-propyltriethoxysilane, 2,2,6,6-tetramethylpiperidino- 4-propylmethyldiethoxysilane, and (partial) hydrolytic condensates thereof. These light stabilizers may be used in admixture of two or more.

The silicone coating composition of the invention may be applied to a substrate by any conventional coating technique, yielding a coated article. A suitable coating technique may be selected from among, for example, brush coating, spraying, dipping, flow coating, roll coating, curtain coating, spin coating, and knife coating.

A cured film of the silicone coating composition of the invention can be formed on the surface of a resin substrate directly or through an intervening layer if necessary. Such an intervening layer is selected from among a primer layer, UV-absorbing layer, printing layer, recording layer, thermal barrier layer, adhesive layer, inorganic evaporated film layer, etc.

Once the silicone coating composition of the invention is coated, it may be cured either by holding in air for drying or by heating. Although the curing temperature and time are not critical, the coating is heated preferably at a temperature below the heat resistant temperature of the substrate for 2 minutes to 2 hours. Specifically, heating at 80 to 150° C. for 5 minutes to 2 hours is preferred.

The thickness of coats or films is not particularly limited and is typically in the range of 0.1 to 50 μm. Films having a thickness of 1 to 20 μm are preferred because they meet the desired hardness, mar resistance, long-lasting adhesion and crack-arresting property.

Furthermore, another coating layer may be formed on the surface of a cured film of the silicone coating composition of the invention, if necessary.

The substrates used herein include molded plastics, wood, ceramics, glass, metals and composites thereof and are not limited thereto. Advantageously, the silicone coating compositions of the invention are applied to substrates of various plastics or organic resins, typically polycarbonates, polystyrene, acrylic resins, modified acrylic resins, urethane resins, thiourethane resins, polycondensates of halogenated bisphenol A with ethylene glycol, acrylic urethane resins, halogenated aryl-containing acrylic resins, sulfur-containing resins, polyalkylene terephthalate resins, cellulose resins, amorphous polyolefin resins, and composite resins thereof. Also included are these resin substrates whose surface has been treated, for example, by chemical treatment, corona discharge treatment, plasma treatment, or treatment with acid or alkaline liquid, as well as laminates of a substrate of a certain resin and a surface layer of a different resin. Exemplary laminates include laminates comprising a polycarbonate resin substrate and a surface layer of acrylic resin or urethane resin, and laminates comprising a polyester resin substrate and a surface layer of acrylic resin, which are manufactured by a co-extrusion or laminating technique.

EXAMPLE

Examples of the present invention are given below by way of illustration and not by way of limitation. Unless otherwise stated, all percents are by weight. Mw denotes a weight average molecular weight as determined by gel permeation chromatography (GPC) using polystyrene standards.

[Preparation of Silicone Resin Consisting of Component (A) and Component (B) and/or (C)]

Preparation Example 1

A 2-L flask was charged with 30.1 g (0.041 mole) of a compound of the formula:

wherein c is 5 on average, and 50 g of t-butanol, which were thoroughly mixed. Then 17 g of 0.25N acetic acid in water was added dropwise to the flask where hydrolysis took place while it was cooled so that the internal temperature might not exceed 40° C. Following the dropwise addition, the reaction solution was stirred below 40° C. for one hour. Then, 291 g of 0.25N acetic acid in water and a previously prepared mixture of 304.8 g (2.24 moles) of methyltrimethoxysilane and 56.0 g (0.16 mole, 0.33 Si mole) of Silicate 35 (by Tama Chemical Co., Ltd., partial hydrolytic condensate of tetraethoxysilane, average dimer) were sequentially fed, after which stirring was carried out below 40° C. for one hour and at 60° C. for a further 3 hours, bringing the hydrolysis to completion.

Thereafter, 300 g of cyclohexanone was poured to the reaction mixture, from which methanol and ethanol products resulting from hydrolysis were distilled off under atmospheric pressure until the liquid temperature reached 95° C. The residue was diluted with isopropanol to a nonvolatile concentration of 20%, and 0.05 g of leveling agent KP-341 (Shin-Etsu Chemical Co., Ltd.) added. Filtration through paper filter yielded a colorless clear silicone resin solution A. This silicone resin had a Mw of 3,800.

Preparation Example 2

A 2-L flask was charged with 25.5 g (0.026 mole) of a compound of the formula:

wherein c is 9 on average, and 31 g of t-butanol, which were thoroughly mixed. Then 10 g of 0.05N nitric acid in water was added dropwise to the flask where hydrolysis took place while it was cooled so that the internal temperature might not exceed 40° C. Following the dropwise addition, the reaction solution was stirred below 40° C. for one hour. Then, 298 g of 0.05N nitric acid in water and a previously prepared mixture of 5.4 g (0.026 mole) of tetraethoxysilane and 239 g (0.48 mole) of $(CH_3O)_3Si—CH_2CH_2—C_4F_8—CH_2CH_2—Si(OCH_3)_3$ were sequentially fed, after which stirring was carried out below 40° C. for one hour and at 60° C. for a further 3 hours, bringing the hydrolysis to completion.

Thereafter, 300 g of propylene glycol monomethyl ether acetate was poured to the reaction mixture, from which methanol and ethanol products resulting from hydrolysis were distilled off under atmospheric pressure until the liquid temperature reached 95° C. The residue was diluted with isopropanol to a nonvolatile concentration of 20%, and 0.05 g of leveling agent FC-4430 (Sumitomo 3M Co., Ltd.) added. Filtration through paper filter yielded a colorless clear silicone resin solution B. This silicone resin had a Mw of 3,600.

Preparation Example 3

A 2-L flask was charged with 26.6 g (0.01 mole) of a compound of the formula:

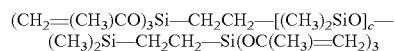

wherein c is 29 on average, 312 g (1.5 moles) of tetraethoxysilane, and 30 g of t-butanol, which were thoroughly mixed. Then 162 g of 0.05N nitric acid in water was added dropwise to the flask where hydrolysis took place while it was cooled so that the internal temperature might not exceed 40° C. After the dropwise addition, the reaction solution was stirred below 40° C. for one hour and at 60° C. for a further 3 hours, bringing the hydrolysis to completion.

Thereafter, the reaction mixture was diluted with t-butanol to a nonvolatile concentration of 20%, and 0.05 g of leveling agent KP-341 (Shin-Etsu Chemical Co., Ltd.) added. Filtration through paper filter yielded a colorless clear silicone resin solution C. This silicone resin had a Mw of 4,100.

[Preparation of Silicone Resin Consisting of Component (A)]

Preparation Example 4

A 2-L flask was charged with 147 g (0.10 mole) of a compound of the formula:

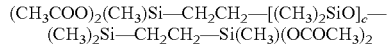

wherein c is 14 on average, and 300 g of isobutanol, which were thoroughly mixed. Then 108 g of deionized water was added dropwise to the flask where hydrolysis took place while it was cooled so that the internal temperature might not exceed 40° C. After the dropwise addition, the reaction solution was stirred below 40° C. for 20 hours, bringing the hydrolysis to completion. Thereafter, the reaction mixture was diluted with isobutanol to a nonvolatile concentration of 20%, and 0.05 g of leveling agent KP-341 (Shin-Etsu Chemical Co., Ltd.) added. Filtration through paper filter yielded a colorless clear silicone resin solution D. This silicone resin had a Mw of 1,600.

Preparation Example 5

A 2-L flask was charged with 535.3 g (1.24 moles) of a compound of the formula:

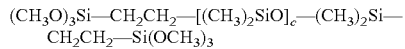

wherein c is 1. Then 269 g of 0.25N acetic acid in water was added dropwise to the flask where hydrolysis took place while it was cooled so that the internal temperature might not exceed 40° C. After the dropwise addition, the reaction solution was stirred below 40° C. for 1 hour and at 60° C. for a further 3 hours, bringing the hydrolysis to completion. Thereafter, 300 g of cyclohexanone was poured to the reaction mixture, from which methanol product resulting from hydrolysis was distilled off under atmospheric pressure until the liquid temperature reached 95° C. The residue was diluted with isopropanol to a nonvolatile concentration of 20%, and 0.05 g of leveling agent KP-341 (Shin-Etsu Chemical Co., Ltd.) added. Filtration through paper filter yielded a colorless clear silicone resin solution E. This silicone resin had a Mw of 2,900.

Preparation Example 6

A 2-L flask was charged with 395.8 g (0.10 mole) of a compound of the formula:

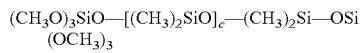

wherein c is 50 on average, and 500 g of t-butanol, which were thoroughly mixed. Then 50 g of 0.25N acetic acid in water was added dropwise to the flask where hydrolysis took place while it was cooled so that the internal temperature might not exceed 40° C. After the dropwise addition, the reaction solution was stirred below 40° C. for 1 hour and at 60° C. for a further 3 hours, bringing the hydrolysis to completion. Thereafter, the reaction mixture was diluted with t-butanol to a nonvolatile concentration of 20%, and 0.05 g of leveling agent KP-341 (Shin-Etsu Chemical Co., Ltd.) added. Filtration through paper filter yielded a colorless, faintly turbid silicone resin solution F. This silicone resin had a Mw of 1,700.

[Preparation of Silicone Resin Consisting of Component (B) and/or (C)]

Preparation Example 7

A 2-L flask was charged with 304.8 g (2.24 moles) of methyltrimethoxysilane and 70.0 g (0.42 mole, 0.83 Si mole) of Silicate 35 (by Tama Chemical Co., Ltd., partial hydrolytic condensate of tetraethoxysilane, average dimer), which were thoroughly mixed. Then 320 g of 0.25N acetic acid in water was added dropwise to the flask where hydrolysis took place while it was cooled so that the internal temperature might not exceed 40° C. After the dropwise addition, the reaction solution was stirred below 40° C. for one hour and at 60° C. for a further 3 hours, bringing the hydrolysis to completion.

Thereafter, 300 g of cyclohexanone was poured to the reaction mixture, from which methanol and ethanol products resulting from hydrolysis were distilled off under atmospheric pressure until the liquid temperature reached 95° C. The residue was diluted with isopropanol to a nonvolatile concentration of 20%, and 0.05 g of leveling agent KP-341 (Shin-Etsu Chemical Co., Ltd.) added. Filtration through paper filter yielded a colorless clear silicone resin solution G. This silicone resin had a Mw of 3,900.

Preparation Example 8

A 2-L flask was charged with 600 g (3.37 Si moles) of methyltriethoxysilane, 168 g of isobutanol, and 0.4 g of acetic acid. To this was added 372 g of water-dispersed silica sol Snowtex O (by Nissan Chemical Industries Ltd.). Hydrolysis took place below 10° C. for 3 hours. Then 105 g of isobutanol-dispersed silica sol IBA-ST-20 (by Nissan Chemical Industries Ltd.) and 29 g of isobutanol were added to the reaction mixture, which was stirred at room temperature for 16 hours and at 60° C. for a further 4 hours, bringing the hydrolysis to completion.

Thereafter, the reaction mixture was diluted with propylene glycol monomethyl ether to a nonvolatile concentration of 20%, and 0.05 g of leveling agent KP-341 (Shin-Etsu Chemical Co., Ltd.) added. Filtration through paper filter yielded a colorless translucent silicone resin solution H. This silicone resin had a Mw of 1,500.

Preparation Example 9

A 2-L flask was charged with 200 g of solid methylsilicone resin KR-220L (by Shin-Etsu Chemical Co., Ltd.), which was dissolved in and diluted with isobutanol to a nonvolatile concentration of 20%. To this was added 0.05 g of leveling agent KP-341 (Shin-Etsu Chemical Co., Ltd.). Thorough stirring and filtration through paper filter yielded a colorless clear silicone resin solution I. This silicone resin had a Mw of 4,000.

[Preparation of Silicone Coating Compositions and Evaluation of Cured Films]

Examples 1-5 & Comparative Examples 1-3

Coating compositions, Nos. 1 to 8, were prepared by compounding each of the silicone resin solutions obtained in the foregoing Preparation Examples, a cure catalyst, and optionally one or more additives, all in the amounts shown in Table 1.

The coating compositions were applied onto the acrylic resin side of polycarbonate/acrylic resin co-extruded plates (300 mm long, 200 mm wide, 0.5 mm thick) by a flow coating technique, and cured at 130° C. for one hour. The cured films were assessed by the following tests. The results are shown in Table 2.

UVA-II: 2-[4-[(2-hydroxy-3-dodecyl/tridecyl-oxypropyl)-oxy]-2-hydroxyphenyl]-4,6-bis(2,4-dimethylphenyl)-1,3,5-triazine (Tinuvin 400 by Ciba Specialty Chemicals)

Hindered amine light stabilizer
   HALS-I: N-acetyl-3-dodecyl-1-(2,2,6,6-tetramethyl-4-piperidinyl)pyrrolidine-2,5-dione (Sanduvor 3058 liquid by Clariant)

TABLE 1

| Coating composition | Silicone resin solution | | | Cure catalyst | Additive |
|---|---|---|---|---|---|
| | Silicone resin of component (A) and component (B) and/or (C) | Silicone resin of component (A) alone | Silicone resin of component (B) and/or (C) | | |
| #1 (Example 1) | Resin A 100 pbw | — | — | TBAH 3 pbw | — |
| #2 (Example 2) | Resin B 100 pbw | — | — | TBAH 3 pbw | — |
| #3 (Example 3) | Resin C 10 pbw | — | Resin G 90 pbw | TBAH 6 pbw | UVA-I 4 pbw |
| #4 (Example 4) | — | Resin D 12 pbw | Resin H 88 pbw | Na-ac 1 pbw | UVA-II 0.5 pbw HALS-I 0.1 pbw |
| #5 (Example 5) | — | Resin E 95 pbw | Resin G 5 pbw | AlAA 2 pbw | Particle-I 2 pbw |
| #6 (Comparative Example 1) | — | — | Resin G 100 pbw | TBAH 3 pbw | — |
| #7 (Comparative Example 2) | — | — | Resin H 88 pbw Resin I 12 pbw | Na-ac 1 pbw | UVA-II 0.5 pbw HALS-I 0.1 pbw |
| #8 (Comparative Example 3) | — | Resin F 10 pbw | Resin H 90 pbw | Na-ac 1 pbw | — |

Silicone resins
  Resin A: Preparation Example 1
  Resin B: Preparation Example 2
  Resin C: Preparation Example 3
  Resin D: Preparation Example 4
  Resin E: Preparation Example 5
  Resin F: Preparation Example 6
  Resin G: Preparation Example 7
  Resin H: Preparation Example 8
  Resin I: Preparation Example 9

Cure catalysts
  TBAH: 0.25% aqueous solution of tetrabutylammonium hydroxide
  Na-ac: 10% aqueous solution of sodium acetate
  AlAA: aluminum acetylacetonate Microparticulate metal oxide
  Particle-I: 20% methanol dispersion of titanium oxide-containing complex metal oxide sol, trade name 1120Z by Catalysts & Chemicals Industries Co., Ltd.

UV absorbers
  UVA-I: 50% 1-methoxy-2-propanol solution of 2-(2'-hydroxy-5'-methacryloxyethylphenyl)-2H-benzotriazole (30%)/methyl methacrylate (70%) copolymer, trade name PUVA-NW, Otsuka Chemical Co., Ltd.

Tests on Cured Films:

Coat Appearance
  The film was visually observed to find any defects.

Mar Resistance
  The test was carried out according to ASTM 1044 using a Taber abrader equipped with an abrasive wheel CS-10F under a load of 500 g. After 500 revolutions, the sample was measured for haze. A difference in haze before and after the test is reported as an index of mar resistance.

Adhesion
  According to JIS K5400, a film was incised with a razor blade at intervals of 2 mm in orthogonal directions to form six incisions in each direction to define 25 square sections. Once a pressure-sensitive adhesive tape, Cellotape® (Nichiban Co., Ltd.) was attached closely to the film, it was rapidly peeled back at an angle of 90°. The number (X) of remaining film sections is reported as X/25.

Water Resistance
  A sample was immersed in boiling water for 2 hours, after which any change of appearance and adhesion were examined.

Heat Resistance

A sample was heated in a hot air circulating drier at 130° C. for one hour, after which it was visually observed to find any cracks.

TABLE 2

| Coating composition | Film appearance | Mar resistance | Appearance after water immersion | Adhesion | Heat resistance |
|---|---|---|---|---|---|
| #1 (Example 1) | good | 6 | intact | 25/25 | intact |
| #2 (Example 2) | good | 8 | intact | 25/25 | intact |
| #3 (Example 3) | good | 7 | intact | 25/25 | intact |
| #4 (Example 4) | good | 4 | intact | 25/25 | intact |
| #5 (Example 5) | good | 7 | intact | 25/25 | intact |
| #6 (Comparative Example 1) | good | 5 | intact | 25/25 | intact |
| #7 (Comparative Example 2) | good | 3 | slightly whitened | 20/25 | cracks |
| #8 (Comparative Example 3) | cissing, cracks | 2 | whitened, cracks | 0/25 | cracks |

Example 6

A primer was prepared by compounding an acrylic primer, Primer PC-7A (Shin-Etsu Chemical Co., Ltd.) with a 20% 1-methoxy-2-propanol solution of a UV absorber (PUVA-30M by Otsuka Chemical Co., Ltd., a copolymer of 30% 2-(2'-hydroxy-5'-methacryloxyethylphenyl)-2H-benzotriazole and 70% methyl methacrylate) in such amounts that the solids of UV absorber was 20% relative to the solids of Primer PC-7A. This primer was previously coated to a polycarbonate resin plate (300 mm long, 200 mm wide, 0.5 mm thick) by flow coating and curing at 130° C. for 30 minutes. To the primed plate, each of coating compositions #1, #3, #4, #5 prepared in Examples 1, 3, 4, 5 and compositions #6 and #7 of Comparative Examples 1 and 2 was coated by flow coating, followed by curing at 130° C. for one hour. The resulting films were evaluated by a weathering test, with the results being shown in Table 3.

Weathering Test

Using Eyesuper UV tester W-151 (Iwasaki Electric Co., Ltd.), a weathering test was carried out over 100 hours and 250 hours by repeating cycles consisting of [black panel temperature 63° C., humidity 50% RH, illuminance 50 mW/cm², raining intervals of 10 sec/hour for 5 hours] and [black panel temperature 30° C., humidity 95% RH for one hour]. Before and after the weathering test, the sample was determined for yellowing factor according to JIS K7103. The weathered film was also examined for cracks and delamination with naked eyes or under a microscope (250× magnifying power).

Weathering Crack Resistance of Film

The film after the weathering test was rated according to the following criterion.

◯: intact

Δ: some cracks

X: cracks on entire film

Weathering Separation Resistance of Film

The film after the weathering test was rated according to the following criterion.

◯: intact

Δ: some delamination between a cured film of silicone resin composition and a cured primer layer X: overall delamination between a cured film of silicone resin composition and a cured primer layer

TABLE 3

| | Results of weathering test | | | | | |
|---|---|---|---|---|---|---|
| | 100 hr weathering test | | | 250 hr weathering test | | |
| Coating composition | Yellowing factor | Crack resistance | Delamination | Yellowing factor | Crack resistance | Delamination |
| #1 (Example 1) | 1 | ◯ | ◯ | 3 | ◯ | ◯ |
| #3 (Example 3) | <1 | ◯ | ◯ | <1 | ◯ | ◯ |
| #4 (Example 4) | <1 | ◯ | ◯ | 1 | ◯ | ◯ |
| #5 (Example 5) | <1 | ◯ | ◯ | 1 | ◯ | ◯ |
| #6 (Comparative Example 1) | 1 | ◯ | ◯ | 4 | Δ | Δ |
| #7 (Comparative Example 2) | <1 | Δ | ◯ | 5 | X | X |

Japanese Patent Application No. 2004-304241 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A silicone coating composition for forming a mar resistant surface film comprising a silicone resin (I) which is obtained by cohydrolytic condensation of:

(A) at least one hydrolyzable organosilicon compound having the general formula (1):

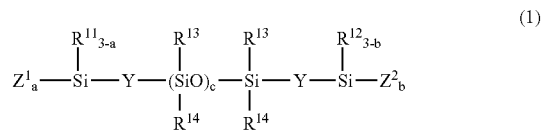

(1)

wherein $R^{11}$, $R^{12}$, $R^{13}$, and $R^{14}$ are each independently a hydrogen atom, alkyl group of 1 to 6 carbon atoms or phenyl group, $Z^1$ and $Z^2$ are each independently selected from the class consisting of a halogen atom, alkoxy group of 1 to 3 carbon atoms, alkoxyalkoxy group of 2 to 4 carbon atoms, acyloxy group of 1 to 6 carbon atoms, alkenoxy group of 1 to 6 carbon atoms, and isocyanate group, Y is an oxygen atom or alkylene group of 2 to 10 carbon atoms, a and b are each independently an integer of 1 to 3, and c is an integer of 1 to 30, and/or a partial hydrolytic condensate thereof, and (B) at least one alkoxysilane having the general formula (2):

(2)

wherein $R^1$ and $R^2$ are each independently hydrogen or a substituted or unsubstituted monovalent hydrocarbon group, $R^3$ is an alkyl group of 1 to 3 carbon atoms, m and n are each independently an integer of 0 or 1, and m+n is 0, 1 or 2, and/or a partial hydrolytic condensate thereof, and/or (C) at least one hydrolyzable organosilicon compound having the general formula (3):

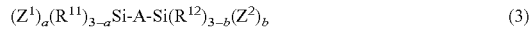

wherein $R^{11}$, $R^{12}$, $Z^1$ and $Z^2$ are as defined above, A is a divalent organic group having at least one fluorine atom, and a and b are as defined above, and/or a partial hydrolytic condensate thereof, and at least one vinyl polymer containing hydrolyzable silyl groups and/or hydroxysilyl groups.

2. The silicone coating composition of claim 1, wherein the silicone resin (I) has a weight average molecular weight of at least 1,500 as determined by gel permeation chromatography versus polystyrene standards.

3. The silicone coating composition of claim 1, wherein in formula (1), a and b are each independently 2 or 3, and c is an integer of 1 to 10.

4. The silicone coating composition of claim 1, further comprising fine particles of at least one type selected from the group consisting of microparticulate metal oxides, microparticulate complex oxides, microparticulate hollow oxides, and microparticulate hollow complex oxides.

5. The silicone coating composition of claim 1, further comprising at least one UV absorber.

6. The silicone coating composition of claim 1, wherein c in formula (1) is an integer of 2 to 10.

7. The silicone coating composition of claim 1, wherein $R^3$ in formula (2) is methyl or ethyl and m=0 and n=0 or m=1 and n=0 or m=1 and n=1.

8. The silicone coating composition of claim 1, wherein $R^1$ and $R^2$ formula (2) are alkyl groups or epoxy- or (meth)acryloxy-substituted hydrocarbon groups and m=1 and n=0 or m=1 and n=1.

9. A silicone coating composition for forming a mar resistant surface coating comprising a silicone resin (II) which is obtained by (co)hydrolytic condensation of (A) at least one hydrolyzable organosilicon compound having the general formula (1):

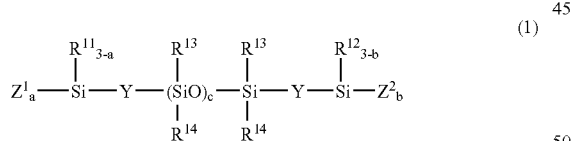

wherein $R^{11}$, $R^{12}$, $R^{13}$, and $R^{14}$ are each independently a hydrogen atom, alkyl group of 1 to 6 carbon atoms or phenyl group, $Z^1$ and $Z^2$ are each independently selected from the class consisting of a halogen atom, alkoxy group of 1 to 3 carbon atoms, alkoxyalkoxy group of 2 to 4 carbon atoms, acyloxy group of 1 to 6 carbon atoms, alkenoxy group of 1 to 6 carbon atoms, and isocyanate group, Y is an oxygen atom or alkylene group of 2 to 10 carbon atoms, a and b are each independently an integer of 1 to 3, and c is an integer of 1 to 30, and/or a partial hydrolytic condensate thereof, or component (A) and (B) at least one alkoxysilane having the general formula (2):

wherein $R^1$ and $R^2$ are each independently hydrogen or a substituted or unsubstituted monovalent hydrocarbon group, $R^3$ is an alkyl group of 1 to 3 carbon atoms, m and n are each independently an integer of 0 or 1, and m+n is 0, 1 or 2, and/or a partial hydrolytic condensate thereof, and a silicone resin (III) which is obtained by (co)hydrolytic condensation of component (B) and/or (C) at least one hydrolyzable organosilicon compound having the general formula (3):

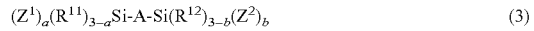

wherein $R^{11}$, $R^{12}$, $Z^1$ and $Z^2$ are as defined above, A is a divalent organic group having at least one fluorine atom, and a and b are as defined above, and/or a partial hydrolytic condensate thereof, and at least one vinyl polymer containing hydrolyzable silyl groups and/or hydroxysilyl groups.

10. The silicone coating composition of claim 9, wherein the silicone resins (II) and (III) each have a weight average molecular weight of at least 1,500 as determined by gel permeation chromatography versus polystyrene standards.

11. The silicone coating composition of claim 9, wherein c in formula (1) is an integer of 2 to 10.

12. The silicone coating composition of claim 9, wherein $R^3$ in formula (2) is methyl or ethyl and m=0 and n=0 or m=1 and n=0 or m=1 and n=1.

13. The silicone coating composition of claim 9, wherein $R^1$ and $R^2$ in formula (2) are alkyl groups or epoxy- or (meth)acryloxy-substituted hydrocarbon groups and m=1 and n=0 or m=1 and n=1.

14. The silicone coating composition of claim 9, further comprising fine particles of at least one type selected from the group consisting of microparticulate metal oxides, microparticulate complex oxides, microparticulate hollow oxides, and microparticulate hollow complex oxides.

15. The silicone coating composition of claim 9, further comprising at least one UV absorber.

16. A coated article comprising a substrate and a cured film of a silicone coating composition comprising
a silicone resin (I) which is obtained by cohydrolytic condensation of:

(A) at least one hydrolyzable organosilicon compound having the general formula (1):

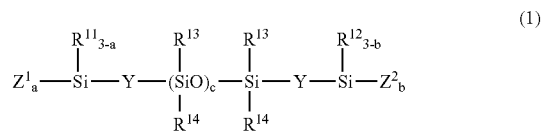

wherein $R^{11}$, $R^{12}$, $R^{13}$, and $R^{14}$ are each independently a hydrogen atom, alkyl group of 1 to 6 carbon atom or phenyl group, $Z^1$ and $Z^2$ are each independently selected from the class consisting of a halogen atom, alkoxy group of 1 to 3 carbon atoms, alkenoxyalkoxy group of 2 to 4 carbon atoms, acyloxy group of 1 to 6 carbon atoms, alkenoxy group of 1 to 6 carbon atoms, and isocyanate group, Y is an oxygen atom or alkylene group of 2 to 10 carbon atoms, a and b are each independently an integer of 1 to 3, and c is an integer of 1 to 30, and/or a partial hydrolytic condensate thereof, and (B) at least one alkoxysilane having the general formula (2):

wherein $R^1$ and $R^2$ are each independently hydrogen or a substituted or unsubstituted monovalent hydrocarbon group, $R^3$ is an alkyl group of 1 to 3 carbon atoms, m and n are each independently an integer of 0 or 1, and m+n is 0, 1 or 2, and/or a partial hydrolytic condensate thereof, and/or (C) at least one hydrolyzable organosilicon compound having the general formula (3):

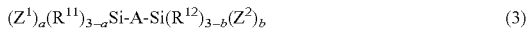    (3)

wherein $R^{11}$, $R^{12}$, $Z^1$ and $Z^2$ are as defined above, A is a divalent organic group having at last one fluorine atom, and a and b are as defined above, and/or a partial hydrolytic condensate thereof, and at least one vinyl polymer containing hydrolyzable silyl silyl groups and/or hydroxysilyl groups, said cured film of the silicone coating composition overlying at least one surface of the substrate directly or via at least one layer of different type.

17. The coated article of claim 16, wherein said substrate is made of glass, metals, ceramics, organic resins or fibers.

18. A coated article comprising
a substrate and
a cured film of a silicone coating composition comprising
  a silicone resin (I) which is obtained by cohydrolytic condensation of:
  a silicone resin (II) which is obtained by (co)hydrolytic condensation of (A) at least one hydrolyzable organosilicon compound having the general formula (1):

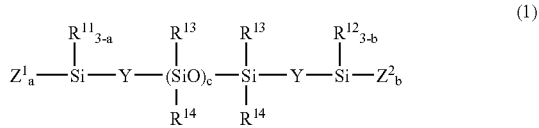    (1)

wherein $R^{11}$, $R^{12}$, $R^{13}$, and $R^{14}$ are each independently a hydrogen atom, alkyl group of 1 to 6 carbon atoms or phenyl group, $Z^1$ and $Z^2$ are each independently selected from the class consisting of a halogen atom, alkoxy group of 1 to 3 carbon atoms, alkoxyalkoxy group of 2 to 4 carbon atoms, acyloxy group of 1 to 6 carbon atoms, alkenoxy group of 1 to 6 carbon atoms, and isocyanate group, Y is an oxygen atom or alkylene group of 2 to 10 carbon atoms, a and b are each independently an integer of 1 to 3, and c is an integer of 1 to 30, and/or a partial hydrolytic condensate thereof, or component (A) and (B) at least one alkoxysilane having the general formula (2):

    (2)

wherein $R^1$ and $R^2$ are each independently hydrogen or a substituted or unsubstituted monovalent hydrocarbon group, $R^3$ is an alkyl group of 1 to 3 carbon atoms, m and n are each independently an integer of 0 or 1, and m+n is 0, 1 or 2, and/or a partial hydrolytic condensate thereof, and a silicone resin (III) which is obtained by (co)hydrolytie condensation of component (B) and/or (C) at least one hydrolyzable organosilicon compound having the general formula (3):

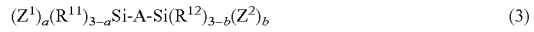    (3)

wherein $R^{11}$, $R^{12}$, $Z^1$ and $Z^2$ are as defined above, A is a divalent organic group having at least one fluorine atom, and a and b are as defined above, and/or a partial hydrolytic condensate thereof, and at least one vinyl polymer containing hydrolyzable silyl groups and/or hydroxysilyl groups, said cured film of the silicone coating composition overlying at least one surface of the substrate directly or via at least one layer of different type.

19. The coated article of claim 18, wherein said substrate is made of glass, metals, ceramics, organic resins or fibers.

* * * * *